(12) United States Patent
Allen (10) Patent No.: US 10,360,015 B2
(45) Date of Patent: *Jul. 23, 2019

(54) UPDATING VIRTUAL MACHINE IMAGES

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,157

(22) Filed: Mar. 28, 2017

(65) Prior Publication Data

US 2017/0272337 A1 Sep. 21, 2017

Related U.S. Application Data

(63) Continuation of application No. 14/133,006, filed on Dec. 18, 2013, now Pat. No. 9,641,406.

(51) Int. Cl.
*G06F 15/173* (2006.01)
*G06F 8/65* (2018.01)

(52) U.S. Cl.
CPC ..................................... *G06F 8/65* (2013.01)

(58) Field of Classification Search
CPC ....... H04L 43/04; G06F 21/53; G06F 9/5077; G06F 2009/45575
USPC ......................................... 709/224, 203, 225
See application file for complete search history.

(56) References Cited

U.S. PATENT DOCUMENTS

| 6,012,130 | A | 1/2000 | Beyda et al. | |
|---|---|---|---|---|
| 8,505,006 | B1 * | 8/2013 | Larkin | G06F 9/45537 718/1 |
| 8,904,081 | B1 | 12/2014 | Kulkarni | |
| 2008/0016387 | A1 * | 1/2008 | Bensinger | G06F 11/1451 714/4.11 |
| 2009/0007105 | A1 * | 1/2009 | Fries | G06F 8/65 718/1 |
| 2009/0292737 | A1 * | 11/2009 | Hayton | G06F 8/658 |
| 2010/0192143 | A1 * | 7/2010 | Ingle | G06F 8/63 717/172 |
| 2011/0099187 | A1 * | 4/2011 | Hansen | G06F 11/2097 707/769 |
| 2011/0265076 | A1 * | 10/2011 | Thorat | G06F 8/65 717/172 |
| 2012/0005672 | A1 | 1/2012 | Cervantes et al. | |
| 2014/0130040 | A1 * | 5/2014 | Lemanski | G06F 9/4856 718/1 |

(Continued)

*Primary Examiner* — Duyen M Doan
(74) *Attorney, Agent, or Firm* — Davis Wright Tremaine LLP (57) ABSTRACT

Remote computing resource service providers allow customers to execute virtual computer systems in a virtual environment on hardware provided by the computing resource service provider. The virtual computer systems may be suspended for an indeterminate amount of time and saved as images in one or more storage systems of the service provider. Periodically, updates for the virtual computer systems are required. In order to update virtual computer systems that are stored in a suspended state, an offline patch and indirection map is generated and used to update the virtual computer systems.

20 Claims, 7 Drawing Sheets

(56) References Cited

U.S. PATENT DOCUMENTS

2014/0164709 A1* 6/2014 Guthrie .............. G06F 12/0806
   711/134
2014/0208314 A1* 7/2014 Jeswani ................... G06F 8/65
   718/1

* cited by examiner

UPDATING VIRTUAL MACHINE IMAGES

CROSS REFERENCE TO RELATED APPLICATION

This application is a continuation of U.S. patent application Ser. No. 14/133,006, filed Dec. 18, 2013, now U.S. Pat. No. 9,641,406, entitled "UPDATING VIRTUAL MACHINE IMAGES," the disclosure of which is hereby incorporated herein in its entirety.

BACKGROUND

The use of remote computing services, such as remote program execution and remote data storage, has greatly increased in recent years. Customers may reduce expenses and overhead by purchasing these services from a computing resource service provider. Customers of the computing resource service provider can interact with computing systems, services and virtual machine instances which are widely distributed. Furthermore, the computing systems, services and virtual machine instances may require periodic updates in order to comply with various policies, such as security policies. To ensure compliance with the various policies one or more agent processes may be run to detect and remediate issues. However, agent processes may require the computing systems, services or virtual machine instances to be running in order for the agent process to detect and apply updates. Computing systems, services or virtual machine instances may be offline or persisted as an offline image for an indefinite period of time. For example, a virtual machine instance may be stored persistently as an image until such time as it is instantiated. Conventional agent processes are often ineffective for updating various components of offline computing system instances.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for applying updates to computer systems. Computing resource service providers (also referred to simply as service providers) may provide resources and services to customers thereby reducing overhead and cost to the customers. In various embodiments, customers execute virtual machine instances (also referred to as computer system instances or simply as instances) on remote computing resources operated by the service provider. On occasion, customers may suspend the execution of instances and at some point later in time resume the execution of these instances. Suspending execution of instances includes persisting the current state of the instance to a storage device so that once the customer resumes execution of the instance, the instance's state can be read from persistent storage and the instance can return to pre-serialization execution. Persisting the current state of the instance to a storage device may include storing an image of the instance, such as an instance snapshot. An indeterminate amount of time may elapse between when an image of an instance is stored and when the customer resumes execution of the instance. During this time one or more updates may be required for the computer systems stored as images.

Updates to the instances may be published in a repository or some other data structure suitable for storing update information. Updates may include software updates, networking updates, security policies, licensing policies, software upgrades, firmware updates, new software, administrative updates, hot fixes, patches or any other information suitable for updating computer systems. The updates may also include other information corresponding to the updates such as a date by which the update must be applied, consequences for not updating by a particular date, computer systems that the update applies to or any other information corresponding to the update. One or more systems or services of the service provider may monitor the update repository and apply the update to instances executing on resources operated by the service provider. If the one or more systems or services of the service provider are unable to apply the update, for example, the instance is currently in a suspended state and not executing on resources operated by the service provider, metadata associated with the instance may be stored corresponding to update information. The metadata may include what update is to be performed, a deadline for performing the update and consequences for not performing the update.

The service provider may operate a monitoring service capable of monitoring instances stored by the service provider. The monitoring service may monitor instances to determine which updates have been applied to the instances and which update must still be applied. Furthermore, the monitoring service may also monitor the deadline associated with the updates and perform various operations in accordance with the deadlines for the updates. The monitoring service may apply updates to virtual machine images stored by the service provider which have not yet been updated. The monitoring service may do this by, first, receiving update information from the update repository. The monitoring service may generate an offline patch (also referred to as an offline update) based at least in part on the update received from the update repository. The offline patch corresponds to changes that may be made to images of the virtual machine instance in order to update the virtual machine instance without requiring the instance to be instantiated. The offline patch may be generated by instantiating a representative virtual machine instance and applying the update to the representative virtual machine instance. The monitoring service may then determine the changes made to the representative virtual machine system and generate the offline patch based at least in part on the determined changes.

Along with generating the offline patch, the monitoring service may generate an indirection map. The indirection map may contain information corresponding to the physical resources of the representative virtual machine and corresponding logical resources. For example, the indirection map may contain the information corresponding to the block-level storage device attached to the representative virtual machine and the logical abstraction of the block-level storage device capable of representing the block-level storage device on one or more other virtual machines. In another example, the representative virtual machine may have a NoSQL database attached as a physical resource with a label, "DB1," assigned by the representative virtual machine allowing the representative virtual machine to access the NoSQL database using label "DB1." The monitoring service may generate the indirection map such that the indirection map contains the translation of the label of the physical resource "DB1" to a logical abstraction such as "the first NoSQL database attached." The monitoring service may use the indirection map to apply the information contained in the offline patch to the appropriate element of the virtual machine image being updated. Returning to the example above, the offline patch may contain information corresponding to changes made to "DB1" on the representative system. The monitoring service may invert the indirection map by converting the logical abstraction "the first NoSQL database attached" to the label for the physical resource of the particular virtual machine being updated. If the particular virtual machine being updated labels the first NoSQL database attached as "MyDB," the monitoring service may then convert the logical abstraction "the first NoSQL database attached" to the label of the physical resource for the particular virtual machine being updated "MyDB." The monitoring service may use the inverted indirection map to translate the offline patch such that the information corresponding to changes made to "DB1" on the representative system, according to the offline patch, is translated to correspond to changes that are to be applied to "MyDB" in order to update the virtual machine.

Subsequent to a deadline for a particular update, the monitoring service may determine the virtual machine images that have not had the particular update applied and apply the offline patch in order to update the virtual machine instances. The monitoring service may apply the offline patch by mounting a copy of the image from storage, inverting the indirection map, translating the offline patch using the inverted indirection map and applying the translated offline patch to the mounted image. The monitoring service may then save the updated copy of the image as a new version of the image or replace the previous version of the image with the updated copy.

Figure 1:
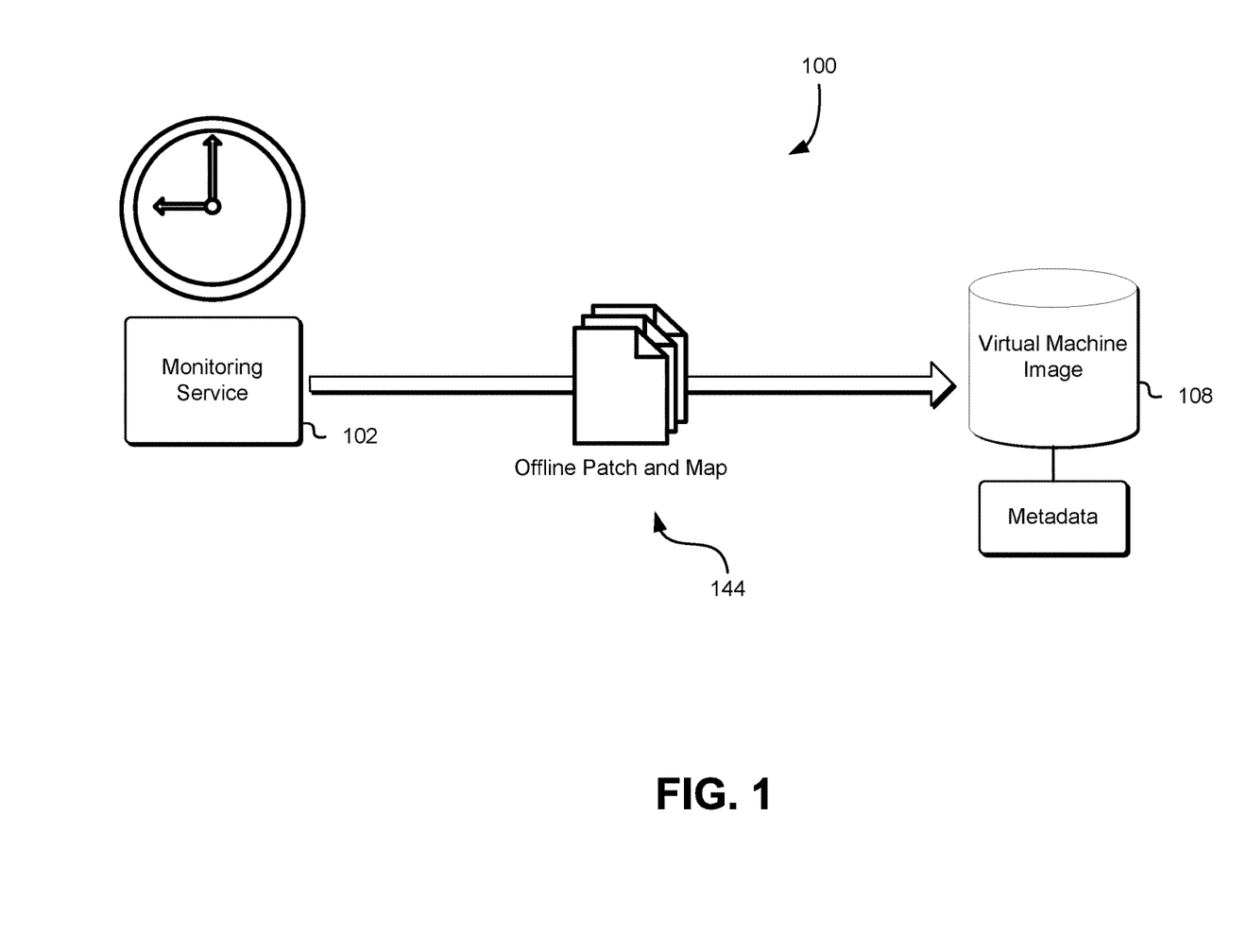
FIG. 1 shows a diagram illustrating various aspects of the present disclosure.

FIG. 1 shows an illustrative example 100 of an aspect of the enhanced updating system for instances in accordance with various aspects of the present disclosure. As noted above, the techniques described herein are applicable to updating virtual machine instance stored in a suspend state without the need for instantiating the instance. Accordingly, FIG. 1 shows an example of monitoring service 102. The monitoring service 102 may be executed by one or more computer systems or computer system instances operated by the service provider. In various embodiments, the monitoring service 102 is responsible for one or more timers (shown as a clock in FIG. 1), keeping track of update information and determining for which instances updates have been applied. The monitoring service 102 may also generate the offline patch information and the indirection map 144. The offline patch information may contain a change log indicating all the changes made to the representative instance during the application of the update. This may include changes to files, file system structure, permissions, database, network interface, drivers, firmware, metadata associated with the instance software or any other data included in the representative system.

The monitoring service 102 may also apply, based at least in part on the indirection map, the offline patch 144 to virtual machine image 108 stored by the service provider. The monitoring service 102 may direct a virtual machine manager responsible for the virtual machine image 108 to mount the image such that the monitoring service 102 is capable of applying the changes to the virtual machine image 108 contained in the offline patch 144. For example, the offline patch may indicate that a particular file on the representative systems was changed and the indirection may indicate the drive and folder location of the file contained in the virtual machine image 108. The virtual machine manager may mount the virtual machine image 108, allowing access to the data contained in the serialized image. The monitoring service 102 may then access the virtual machine image 108 and make the appropriate changes according to the information contained in the offline patch 144.

The monitoring service 102 or one or more other services of the service provider may update the metadata associated with the virtual machine image 108 based at least in part on a change to an instantiated virtual machine corresponding to virtual machine image 108. For example, the virtual machine image 108 may be instantiated by one or more services of the service provider and operated by a user. The user may install a virtual network device during the operation of the virtual machine and the monitoring service 102 may detect the change to the virtual machine and update the metadata associated with the virtual machine image 108 such that the representative virtual machine associated with the virtual machine image 108 is representative of the virtual machine including the newly added virtual network device. In another example, the virtual machine image 108 may be instantiated and a new piece of software may be installed on the virtual machine. The monitoring service 102 may detect the change to the virtual machine and update the metadata associated with the virtual machine image 108 such that the representative virtual machine associated with the virtual machine image 108 contains information corresponding to the new piece of software installed on the virtual machine.

Figure 2:
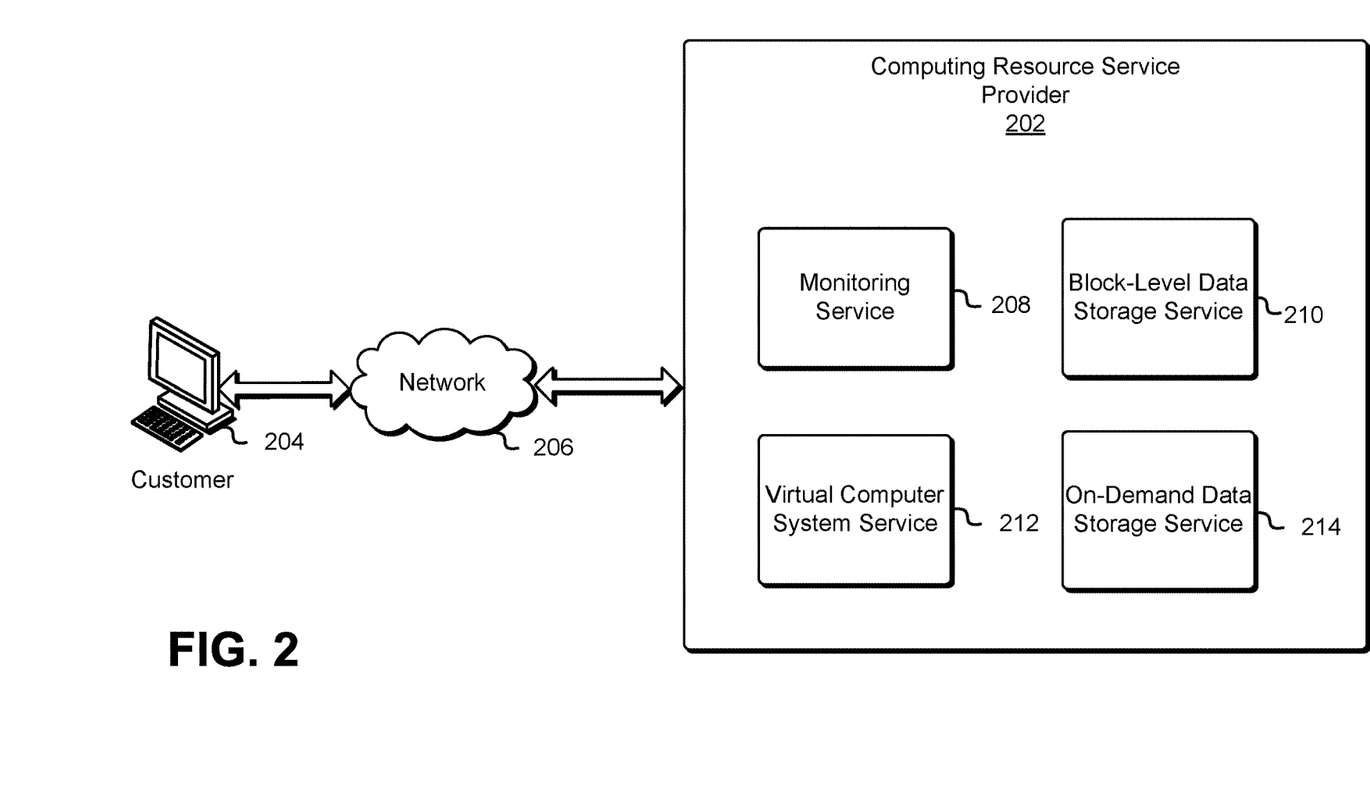
FIG. 2 shows an example of a customer connected to a computing resource service provider.

FIG. 2 shows a customer connected to a computing resource service provider offering a plurality of services in accordance with at least one embodiment. The computing resource service provider 202 may provide a variety of services to the customer 204. The customer 204 may be a service that provides electronic or network-based functionalities or tools to a user. The service may be any service that is executed by one or more instances. For example, one or more of the services offered by the service provider may be a customer 204 of the monitoring service 208 and use the monitoring service 208 to update offline instances. The customer 204 may also be an organization that may utilize one or more of the services provided by the computing resource service provider 202 to maintain and deliver information to its employees, which may be located in various geographic locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such as the Internet, an intranet or an Internet service provider (ISP) network. Some communications from the customer 204 to the computing resource service provider 202 may cause the computing resource service provider 202 to operate in accordance with one or more embodiments described herein or a variation thereof.

The computing resource service provider 202 may provide various computing resource services to its customers. The services provided by the computing resource service provider 202, in this example, include a monitoring service 208, a virtual computer system service 212, a block-level data storage service 210 and an on-demand data storage service 214. It is noted that not all embodiments described herein include the services 208-214 of the computing resource service provider 202 and additional services may be provided in addition to or as an alternative to services explicitly described herein. Each of the services may include one or more web service interfaces that enable the customer 204 to submit appropriately configured Application Program Interface (API) calls to the various services through web service requests. In addition, each of the services may include one or more service interfaces that enable the services to access each other (e.g., to enable a virtual computer system of the virtual computer system service 212 to store data in or retrieve data from the on-demand data storage service 214 and/or to access one or more block-level data storage devices provided by the block level data storage service 210).

The virtual computer system service 212 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications, or, generally, to serve as computing power for the customer. Other applications for the virtual computer systems may be to support database applications, electronic commerce applications, business applications, and/or other applications.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 212 to serve as logical units (e.g., virtual drives) for the computer systems. A block-level storage device may enable the persistent storage of data used/generated by a corresponding virtual computer system where the virtual computer system service 212 may only provide ephemeral data storage.

The computing resource service provider 202 may also include an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may also be accessible to the monitoring service 208. For example, the monitoring service may store the offline patch and indirection map with the on-demand data storage service 214. Access to the data storage service by a customer, another service, or other entity may be through appropriately configured API calls.

The monitoring service 208 comprises one or more resources collectively configured to monitor virtual computer systems instantiated by the virtual computer system service 212. The monitoring service 208 may monitor running instances as well as instances persistently stored in a suspended state. The monitoring service 208 may perform various functions using the resources of one or more other services. For example, the monitoring service 208 may monitor instances by transmitting appropriately configured API requests to the virtual computer system service 212. The monitoring service 208 may also operate one or more testing systems used to instantiate representative virtual machine instances and record at least a portion of the operation of the representative virtual machine instances.

Figure 3:
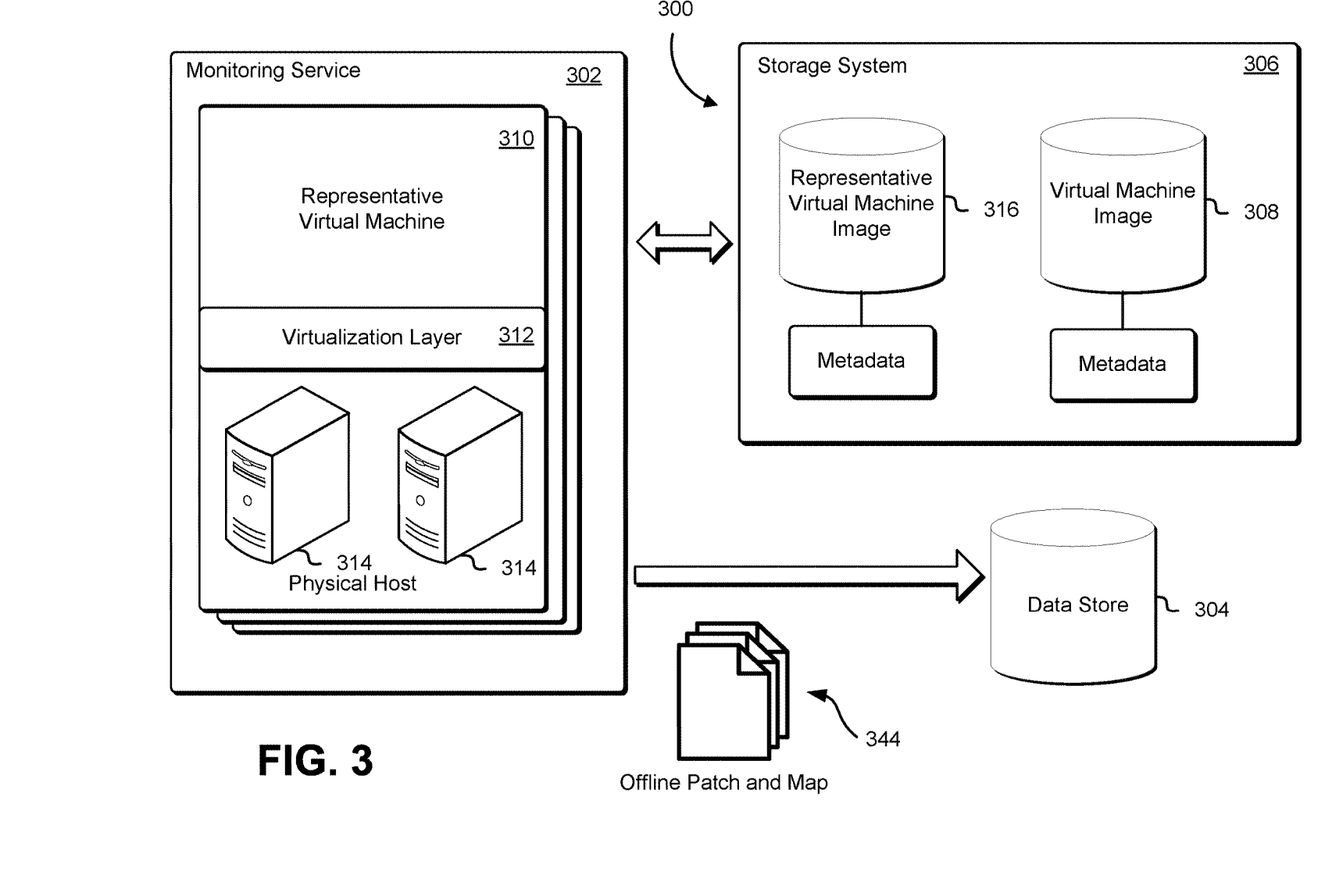
FIG. 3 shows a diagram illustrating a manner in which a change log and an indirection map may be generated in accordance with at least one embodiment.

FIG. 3 shows an example 300 of the monitoring service 302 generating and storing the offline patch and indirection map 344 based at least in part on information collected from the execution of the representative virtual machine instance 310. Accordingly, the service provider may operate one or more storage systems 306 to act as repository for virtual machine images 308. The virtual machine images 308 may correspond to a virtual machine instance. The virtual machine instance may be used by a customer, as described above in connection with FIG. 2, to perform a variety of functions. For example, the customer may be an employee of an organization and use the virtual machine instance to perform various tasks for the organization. The virtual machine image 308 may also have metadata associated with the virtual machine instance 308. The metadata may include information corresponding to update information associated with the virtual machine. For example, the monitoring service 302 may write into the metadata of the virtual machine instance that a particular update must be applied before a predetermined deadline.

If the virtual machine image 308 is used to instantiate the virtual machine and the particular update is performed before the predetermined deadline, the monitoring service 302 may update the metadata to reflect that the virtual machine image 308 has been updated. The storage system 306 may be a repository of virtual machine images 308 and contain various different images of virtual machines used by one or more customers. Furthermore, the storage system 306 may also contain one or more representative virtual machine images 316. These representative virtual machine images 316 may be used to instantiate a virtual machine that is sufficiently similar to one or more other virtual machines that the monitoring service 302 may use the representative virtual machine to generate the offline patch and indirection map. For example, a particular virtual machine may be based on a template and the representative virtual machine may be based on the same template. The monitoring service 302 may also collect information corresponding to the virtual machine image 308 and determine, based at least in part on the collected information, a representative virtual machine image 316 suitable for generating the offline patch and the indirection map. For example, the monitoring service 302 may determine the operation system and/or version information of the virtual machine image 308 and use a representative virtual machine image 316 with the same operating system and/or version information.

The monitoring service 302 may retrieve a copy of the representative virtual machine image 316 from storage 306 and instantiate, based at least in part on the representative virtual machine image 316, a representative virtual machine 310. The representative virtual machine 310 may be executed on one or more physical hosts 314 and may interact with the physical resources of the host through a virtualization layer 312. The virtualization layer 312 may be a virtual machine manager, hypervisor or any other system suitable for supporting virtual machines. The representative virtual machine 310 may be run in a test system or other type of system capable of recording all of the operations, alterations, and any other information corresponding to the representative virtual machine that occur during execution. The monitoring service may also contain an update repository (not shown in FIG. 3 for simplicity) containing updates to virtual machines.

The monitoring service 302 may receive an update and start generating the offline patch and indirection map for various virtual machine images. In various embodiments, the monitoring service waits until the expiration of the deadline before generating the offline patch and indirection map. Returning to FIG. 3, once an update is received the monitoring service 302 may determine one or more representative virtual machine images 316 to be used to generate the corresponding offline patches and indirection maps. The updates may be received from various sources, such as software distributors, system administrators, customers or any other source responsible for all or part of the virtual machines. The monitoring service 302 or one or more other services of the service provider may instantiate the representative virtual machine 310. An agent process on the representative virtual machine may perform the update and the monitoring service 302 or one or more other services of the service provider may then monitor the representative virtual machine 310 in order to generate a change log corresponding to performance of the update on the representative virtual machine 310. In various embodiments, the monitoring service 302 performs the update of the representative virtual machine 310. The monitoring service 302 may receive from the virtualization layer 312 all operations performed during the execution of the update and use the information received to generate a change log and/or offline patch. The change log may also be used to generate the offline patch. In various embodiments, the change log is used as the offline patch. The change log may include information about what files or other data has been changed during execution of the update.

After the update has completed, the monitoring service may generate an indirection map corresponding to the representative virtual machine 310. The indirection map may contain information translating physical resources of the representative virtual machine 310 to the resources' canonical representation. For example, various operating systems have canonical names for attached block-level storage devices (e.g., hard disk drives) and the indirection map translates the representation of the drives attached to the representative virtual machine 310 to the equivalent canonical representation. Specifically, WINDOWS® uses the canonical name "SYSTEM" for hard disk drives (or their logical equivalents) containing start-up related data. However, the computer system running the WINDOWS® operating system will have a specific name for the drive, such as "C:" drive. The indirection map defines the conversion from the specific name (e.g., "C:") to the canonical name (e.g., "SYSTEM") useable with other computer systems with similar configurations. The offline patch and indirection map 344 may then be stored in a data store 304. The data store may be part of the monitoring service 302 or one or more other services of the service provider.

Figure 4:
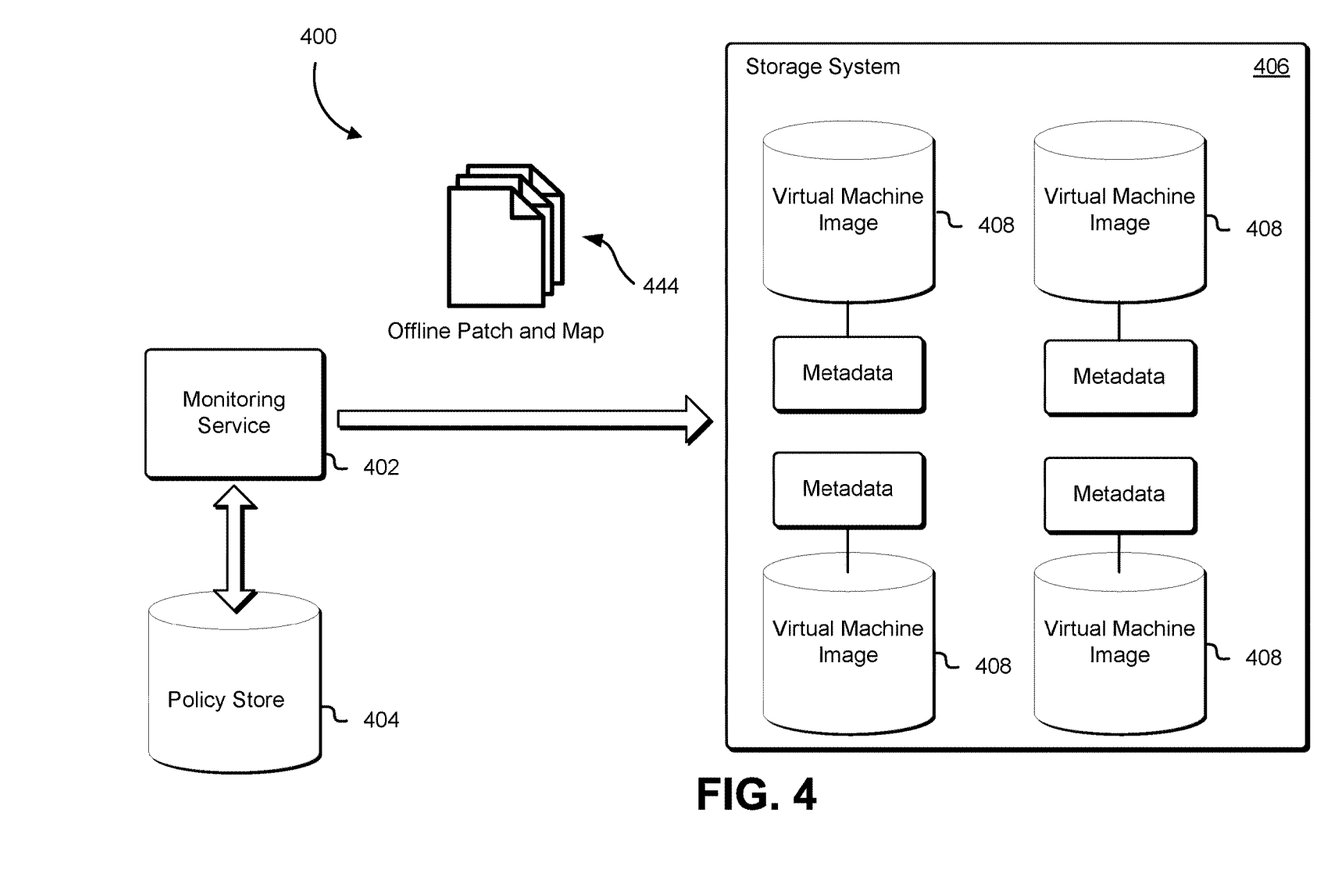
FIG. 4 shows a diagram illustrating a manner in which an offline virtual machine may be updated in accordance with at least one embodiment.

FIG. 4 shows an example 400 of the monitoring service 402 applying an offline patch to one or more virtual machine images 408. The virtual machine images 408 may be stored in a storage system 406. Furthermore, the virtual machine images 408 may have metadata associated with them. The metadata may be any information related to the virtual machine to which the image corresponds or virtual machine image itself such as the customer responsible for the instance, the state of the instance, the date the image was created, the last day the instance was in operation or update information. The monitoring service 402 may also maintain a policy store 404. The policy store 404 may contain information regarding updates to various virtual machines, deadlines for when the updates must be applied and consequences for not applying the update. The policy store 404 may also contain information identifying the virtual machine that various updates apply to. The identifying information may include information identifying a group of virtual machines, types of virtual machines, particular virtual machines or any other information suitable for identifying any existing virtual machine or virtual machines that may be generated at a later date. For example, the policy store 404 may contain information identifying a particular type of virtual machine and an update to be applied to all virtual machines of that type. A customer may then later cause a virtual machine of that type to be generated and the update contained in the policy store may still apply to the virtual machine.

The monitoring service 402 may have one or more timers or other systems to monitor deadlines and determine when to perform various updates according to information contained in the policy store 404. Subsequent to the expiration of a deadline, the monitoring service 402 may retrieve the offline patch and indirection map 444 in order to perform the required updates on the one or more virtual machine images 408. The offline patch and indirection map 444 may be stored in one or more storage systems of the service provider such as the policy store 404. In various embodiments, once the deadline has expired the monitoring service 402 may generate the offline patch and indirection map 444 as described above with reference to FIG. 3. Returning to FIG. 4, the monitoring service 402 or one or more other services of the service provider may mount the virtual machine image 408 such that the monitoring service is capable of accessing and altering the data contained in the virtual machine image 408. The monitoring service 402 may then invert the indirection map for the particular virtual machine image 408 to be updated and translate the offline patch so it may be applied to the particular virtual machine image 408.

The translated offline patch may now be capable of indicating to the monitoring service 402 changes to be made to the virtual machine image 408 in order to apply the update. For example, the translated offline patch may indicate a particular file path and file to be updated according to the information contained in the policy store 404 as well as one or more registry entries to be updated. The monitoring service 402 may access the virtual machine image 408 and make the changes according to the translated offline patch. After the monitoring service 402 makes the changes according to the translated offline patch, the monitoring service 402 may return the virtual machine image 408 to the storage system 406. Furthermore, the monitoring service may write information to the metadata associated with the virtual machine image. The metadata may include version information, information corresponding to the update applied, information corresponding to previous versions of the virtual machine or any other suitable information. When a customer later requests the virtual machine image 408 be used to instantiate an instance of the virtual machine, the customer may be presented with the options of loading the updated version or loading a previous version and performing the update.

In various embodiments, the monitoring service 402 may, after completion of the update, test the virtual machine by instantiating an instance of the virtual machine using the virtual machine image 408 in order to determine if the update was applied correctly and if the virtual machine instance is functioning correctly. If the test of the virtual machine instance is completed successfully the monitoring service 402 may generate an image of the virtual machine and store the image in the storage system 406. One or more other tests may also be performed to determine if the update has been applied successfully. Furthermore, once the updated virtual machine image 408 has been stored in the storage system 406, previous versions of the virtual machine image 408 may be deleted or otherwise destroyed.

Figure 5:
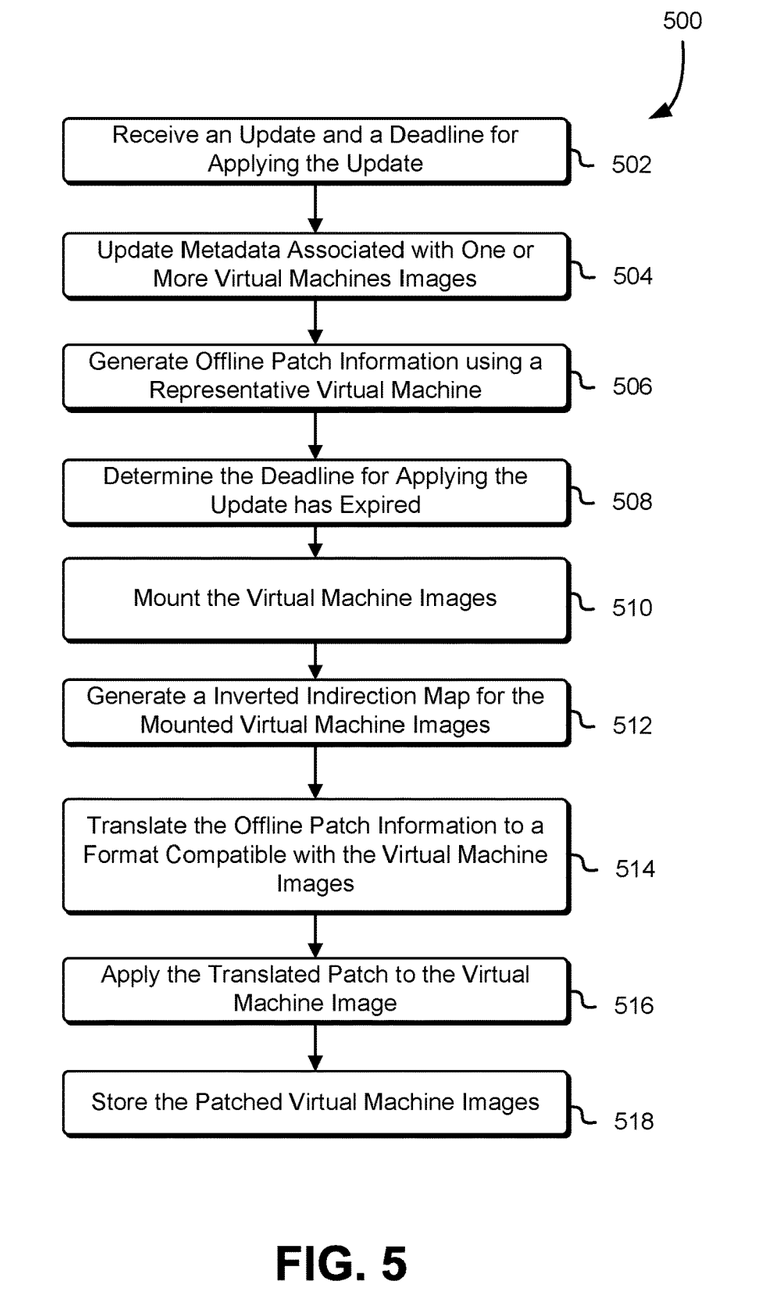
FIG. 5 shows an illustrative example of a process for updating offline virtual machine images in accordance with at least one embodiment.

FIG. 5 shows an illustrative example of process 500 which may be used to update a virtual machine without requiring the virtual machine to be instantiated. The process 500 may be performed by any suitable system, such as by the computer resource service provider as described in connection with FIG. 4 and/or an appropriate component thereof, such as by the monitoring service 402. Returning to FIG. 5, in an embodiment, the process 500 includes receiving an update and a deadline or time period for which the update is to be applied 502. The update may include an update to security policies, licensing policies, network policies, access polices, software updates, firmware updates, registry updates or update information corresponding to any component of a virtual machine capable of being updated. The update may further include information indicating a particular virtual machine, group of virtual machines or other identifying information for which the update is to be applied. For example, the update may include information indicating that all of the virtual machines associated with a particular customer are to receive the update. In various embodiments, the monitoring service determines, based at least in part on information contained in the update, which virtual machines the update applies to. For example, the update may be for a particular piece of software and the monitoring service may determine one or more virtual machines with the particular piece of software that are to be updated.

Once the update has been received, the monitoring service or some other service of the service provider may update the metadata associated with the virtual machine images 504 that are to be updated. The monitoring service may also generate the offline patch information using a representative virtual machine 506 as described above in connection with FIG. 3. After generating the offline patch, the monitoring service may also generate the indirection map and store both the offline patch and indirection map in a storage system. The monitoring service may, at some later point in time, determine that the deadline for applying one or more updates has expired. The monitoring service may make this determination by using one or more timers, alarms, reminders or any other system capable of determining when a deadline has expired.

After the expiration of the deadline 508, the monitoring service may transmit an API call or other request to the virtual machine manager responsible for the instances to be updated to mount the images of the virtual machines 510. In various embodiments, the monitoring service may access the data stored in the image without mounting the image. The monitoring service may then collect information from the mounted image in order to generate the inverted indirection map 512 used to translate the offline patch 514. The monitoring service may take the logical equivalents of the representative virtual machine and invert them into the physical resources of the mounted virtual machine image. For example, the logical equivalent contained in the indirection map may be "block-level storage device one" which may be converted by the monitoring service to "C" drive in the virtual machine image. In another example, the logical equivalent contained in the indirection map may be "network interface" which may be converted by the monitoring service to "NIC1" in the virtual machine image.

Using this information the monitoring service may translate the change to the virtual machine contained in the offline patch to changes specific to the mounted virtual machine 514. With the translated patch the monitoring service may then apply the translated patch to the virtual machine image 516. This may include adding, deleting or altering data stored in the virtual machine image. After applying the patch the virtual machine image may be un-mounted and stored 518 in one or more storage systems of the service provider.

Figure 6:
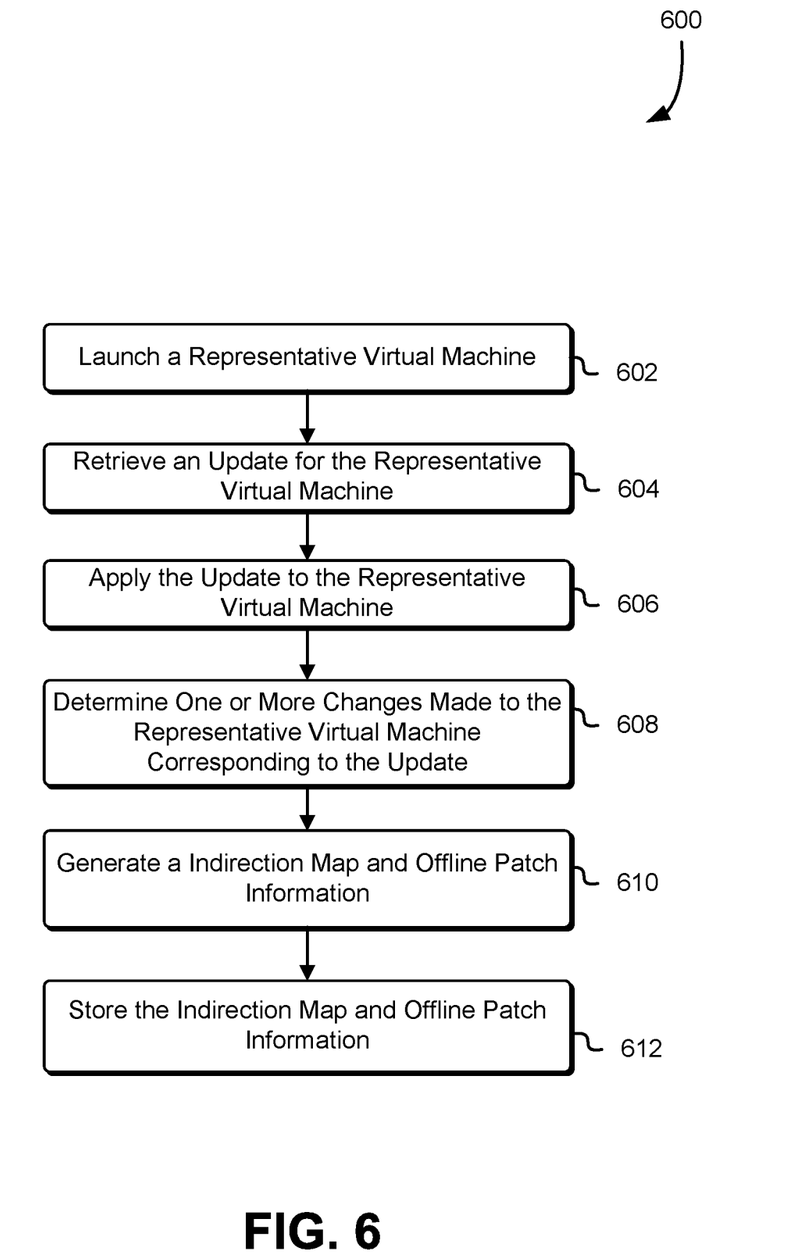
FIG. 6 shows an illustrative example of a process for generating a change log and indirection map in accordance with at least one embodiment.

FIG. 6 shows an illustrative example of process 600 which may be used to generate an offline patch and indirection map. The process 600 may be performed by any suitable system, such as by the computer resource service provider as described in connection with FIG. 3 and/or an appropriate component thereof, such as by the monitoring service 302. Returning to FIG. 6 in an embodiment, the process 600 includes launching a representative virtual machine 602. The monitoring service may determine a representative virtual machine based at least in part on information contained in the update and/or information corresponding to virtual machines stored by the service provider. The monitoring service may then retrieve the update 604 and/or information corresponding to the update for which an offline patch is to be generated. The representative virtual machine or agent process on the representative virtual machine may receive the update from the monitoring service and perform the update 606. In various embodiments, the monitoring service or one or more other services of the service provider may apply the update directly.

While the representative virtual machine performs the update, the operations performed may be recorded and/or monitored in order to determine the changes caused by the update 608. In various embodiments, the monitoring service may wait until the update has been completed and determine what changes have been made to the representative virtual machine, as a result of performing the update, after the update has been completed. Based at least in part on the changes to the representative virtual machine by the update, the offline patch and the indirection map may be created 610. The monitoring service may generate the offline patch such that it contains information corresponding to the changes caused by the update. For example, the update may have changed the security policies of the representative virtual machine so that particular network ports are blocked. The offline patch may then contain only the information corresponding to the security policy or alternatively it may contain information corresponding to the operations required to perform the specified changes to the security policy. In various embodiments, the offline patch contains all of the operations performed by the representative virtual machine during performance of the update. The indirection map may be generated based at least in part on the physical resources of the representative virtual machine. For example, the physical resources of the representative virtual machine may be converted to logical equivalents which may be used to abstract physical resources across various computer systems. The generated offline patch and indirection map 610 may be stored in a storage system of the service provider 612.

Figure 7:
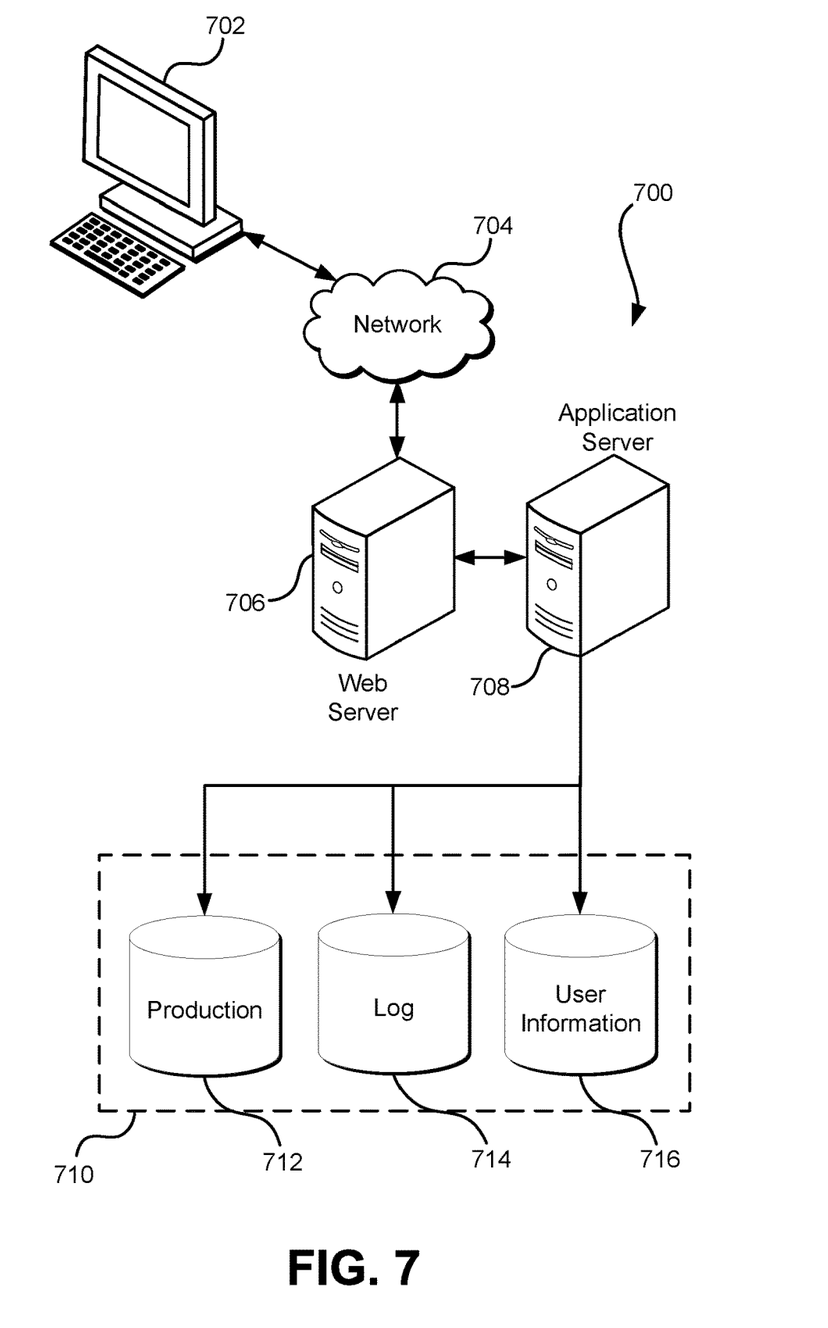
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a patch identifying a log of changes to be made to a virtual machine instance;
    updating a different virtual machine instance based at least in part on the log of changes;
    generating a mapping between the different virtual machine instance and a resource associated with the log of changes;
    identifying, based at least in part on the log of changes, the virtual machine instance; and
    updating the virtual machine instance based at least in part on the log of changes identified in the patch and the mapping.

2. The computer-implemented method of claim 1, further comprising storing an image of the virtual machine instance after updating.

3. The computer-implemented method of claim 1, wherein the patch includes at least one of a security policy update, licensing policy update, software update, access rights update, database update, operating system update, firmware update, networking interface update or administrative update.

4. The computer-implemented method of claim 1, wherein the patch is generated by the different virtual machine instance that is instantiated from a template associated with the log of changes.

5. A system, comprising:
memory to store instructions, as a result of being executed by one or more processors, cause the system to:
generate a patch identifying a log of changes to be made to a virtual machine instance;
update a different virtual machine instance based at least in part on the log of changes;
generate a mapping between the different virtual machine instance and a resource associated with the log of changes;
identify, based at least in part on the log of changes, the virtual machine instance; and
update the virtual machine instance based at least in part on the log of changes identified in the patch and the mapping.

6. The system of claim 5, wherein the instructions that identify the virtual machine instance, as a result of being executed by the one or more processors, further cause the system to identify the virtual machine instance based at least in part on expiration of a period of time associated with updating the virtual machine instance.

7. The system of claim 5, wherein the instructions, as a result of being executed by the one or more processors, further cause the system to:
generate the different virtual machine instance; and
update the different virtual machine instance to generate the log of changes prior to identifying the virtual machine instance.

8. The system of claim 7, wherein the instructions that cause the updating of the virtual machine instance, as a result of being executed by the one or more processors, further cause the system to:
generate a mapping between the different virtual machine instance and an updated resource associated with the log of changes; and
update the virtual machine instance based at least in part on the mapping.

9. The system of claim 7, wherein the instructions that generate the different virtual machine instance, as a result of being executed by the one or more processors, further cause the system to generate the different virtual machine instance based at least in part on the identified virtual machine instance.

10. The system of claim 5, wherein, prior to being updated, the virtual machine instance lacks access to the resource associated with the log of changes.

11. The system of claim 5, wherein the instructions, as a result of being executed by the one or more processors, further cause the system to store an image of the virtual machine instance after being updated, the image including version information newer than that of a previous image of the virtual machine instance.

12. A non-transitory computer-readable storage medium comprising executable instructions that, as a result of being executed by one or more processors of a computer system, cause the computer system to at least:
generate a patch identifying a log of changes to be made to a virtual machine instance;
update a different virtual machine instance based at least in part on the log of changes;
generate a mapping between the different virtual machine instance and a resource associated with the log of changes;
identify, based at least in part on the log of changes, the virtual machine instance; and
update the virtual machine instance based at least in part on the log of changes identified in the patch and the mapping.

13. The non-transitory computer-readable storage medium of claim 12, wherein the instructions that cause the computer system to generate the patch, as a result of being executed by the one or more processors, further cause the computer system to at least:
generate a different virtual machine instance;
update the different virtual machine instance based at least in part on a state of access, by the different virtual machine instance, to the resource;
record one or more operations of the different virtual machine instance during the updating; and
generate mapping information associated with the resource based at least in part on the recorded one or more operations.

14. The non-transitory computer-readable storage medium of claim 13, wherein the instructions that cause the computer system to identify the virtual machine instance include instructions that, as a result of being executed by the one or more processors, further cause the computer system to update the virtual machine instance using the mapping information.

15. The non-transitory computer-readable storage medium of claim 12, wherein the virtual machine instance is identified based at least in part on expiration of a period of time associated with updating the virtual machine instance.

16. The non-transitory computer-readable storage medium of claim 12, wherein the instructions, as a result of being executed by the one or more processors, further cause the computer system to generate an image of the virtual machine instance after the virtual machine instance is updated.

17. The non-transitory computer-readable storage medium of claim 16, wherein the image is associated with version information newer than that of a previous image of the virtual machine instance.

18. The non-transitory computer-readable storage medium of claim 17, wherein the instructions, as a result of being executed by the one or more processors, further cause the computer system to provide, in connection with a request to instantiate the virtual machine instance after the virtual machine instance is updated, both the previous image and the image for instantiation.

19. The computer-implemented method of claim 1, wherein the different virtual machine instance has similar characteristics as the virtual machine instance.

20. The computer-implemented method of claim 1, wherein the mapping includes a corresponding logical abstraction associated with the computing resource of the different virtual machine instance.

* * * * *